United States Patent
Gomony et al.

(10) Patent No.: US 11,405,243 B2
(45) Date of Patent: Aug. 2, 2022

(54) METHOD AND APPARATUS FOR SIGNAL PROCESSING WITH NEURAL NETWORKS

(71) Applicant: Nokia Solutions and Networks Oy, Espoo (FI)

(72) Inventors: Manil Dev Gomony, Espoo (FI); Purushotham Murugappa Velayuthan, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/276,264

(22) PCT Filed: Sep. 23, 2019

(86) PCT No.: PCT/EP2019/075500
§ 371 (c)(1),
(2) Date: Mar. 15, 2021

(87) PCT Pub. No.: WO2020/069895
PCT Pub. Date: Apr. 9, 2020

(65) Prior Publication Data
US 2022/0038313 A1    Feb. 3, 2022

(30) Foreign Application Priority Data

Oct. 4, 2018  (EP) .................................. 18198560

(51) Int. Cl.
*H04L 25/02*  (2006.01)
*H04L 25/03*  (2006.01)
(Continued)

(52) U.S. Cl.
CPC ..... *H04L 25/03165* (2013.01); *G06N 3/0454* (2013.01); *H04L 1/0009* (2013.01);
(Continued)

(58) Field of Classification Search
CPC ............... H04L 25/03165; H04L 1/203; H04L 25/0204; H04L 27/2649; H04L 25/0254
(Continued)

(56) References Cited

U.S. PATENT DOCUMENTS

| 11,233,561 | B1 * | 1/2022 | O'Shea | .................. G06N 20/00 |
| 2018/0322389 | A1 * | 8/2018 | O'Shea | ................ G06N 3/0454 |

(Continued)

OTHER PUBLICATIONS

Gao Xuanxuan et al.: "ComNet: Combination of Deep Learning and Expert Knowledge in OFDM Receivers", IEEE Communications Letters, IEEE Service Center, Piscataway, NL, US, vol. 22, No. 12, Oct. 25, 2018 (Oct. 25, 2018), pp. 1-11, XP011699245, ISSN: 1089-7798, DOI: 10.1109/LCOMM.2018.2877965.
(Continued)

*Primary Examiner* — Emmanuel Bayard
(74) *Attorney, Agent, or Firm* — Harness, Dickey & Pierce, P.L.C.

(57) ABSTRACT

An apparatus for processing a received radio signal includes at least one processor and at least one memory. The at least one memory storing computer program code. The at least one memory and the computer program code being configured to, with the at least one processor, cause the apparatus to at least in part perform processing (received radio signal data with first and second signal processing chains, which respectively include first and second processing modules configured to respectively determine first output and an estimation of the first output data, and determine second output data using a neural network based on the estimation; updating parameters of the neural network based on the first output data and the second output data; and after the updating, processing the received radio signal data with the second signal processing chain, without applying the first processing module.

8 Claims, 2 Drawing Sheets

(51) Int. Cl.
  *G06N 3/04* (2006.01)
  *H04L 1/00* (2006.01)
  *H04L 1/20* (2006.01)
  *H04L 27/26* (2006.01)
(52) U.S. Cl.
  CPC .......... *H04L 1/203* (2013.01); *H04L 25/0204* (2013.01); *H04L 27/2649* (2013.01)
(58) Field of Classification Search
  USPC .................. 375/219, 224, 347, 349, 358
  See application file for complete search history.

(56) References Cited

U.S. PATENT DOCUMENTS

| | | | | |
|---|---|---|---|---|
| 2019/0336108 | A1* | 11/2019 | Hope Simpson ... | G01S 15/8977 |
| 2019/0349037 | A1* | 11/2019 | O'Shea ................ | H04B 7/0413 |
| 2020/0018815 | A1* | 1/2020 | O'Shea ................ | G01S 5/0268 |

OTHER PUBLICATIONS

International Search Report PCT/ISA/210 for International Application No. PCT/EP2019/075500 dated Jan. 8, 2020.
Written Opinion of the International Searching Authority PCT/ISA/237 for International Application No. PCT/EP2019/075500 dated Jan. 8, 2020.
Hengtao He et al.: "Model-Driven Deep Learning for Physical Layer Communications", Arxiv.org, Cornell University Library, 201 Olin Library Cornell University Ithica, NY 14853, Sep. 17, 2018 (Sep. 17, 2018), XP080917964, p. 3, line 4-last line p. 5, last line-p. 6, line 1 figures 3, 5 p. 7, line 5-7 pp. 11-12, section B.

* cited by examiner

METHOD AND APPARATUS FOR SIGNAL PROCESSING WITH NEURAL NETWORKS

CROSS-REFERENCE TO RELATED APPLICATIONS

This application is a national phase under 35 U.S.C. § 371 of PCT International Application No. PCT/EP2019/075500 which has an International filing date of Sep. 23, 2019, which claims priority to European Application No. 18198560.7, filed Oct. 4, 2018, the entire contents of each of which are hereby incorporated by reference.

FIELD OF THE INVENTION

The present invention relates to the field of signal processing. In particular, the present invention relates to a method and an apparatus for processing received radio signal.

BACKGROUND

A wireless baseband processing receiver needs to perform Channel estimation, Demodulation and Turbo/LDPC/Polar decoding efficiently to retrieve the information correctly. Channel detection is a quite complex and time critical operation that involves equalization and noise compensation which relies on efficient Parameter estimation algorithms. For instance, a channel estimation algorithm based on well-known MMSE, zero forcing uses high dimensional matrix inversion. Often these inverse matrices should be of high precision requiring closed loop tracking of varying channel conditions. Similarly, the Demodulation involves computationally intensive operations to compute the log-likelihood ratio (LLR) for the Turbo/LDPC/Polar decoder. Due to the complexity of the Channel estimation and Demodulation algorithms, hardware realization of such functions may result in high power consumption and long latency.

SUMMARY

It is thus an object of embodiments of the present invention to propose a method and an apparatus for signal processing, which do not show the inherent shortcomings of the prior art.

Accordingly, embodiments relate to an apparatus for processing a received radio signal, the apparatus comprising means configured for:
  processing received radio signal data with a first signal processing chain, wherein said first processing chain comprises at least one first processing module configured for determining first output data based on said received radio signal data,
  processing said received radio signal data with a second signal processing chain, wherein said second processing chain comprises at least one second processing module configured for determining an estimation of said first output data based on said received radio signal data, and at least one neural network configured for determining second output data based on said estimation,
  updating parameters of said at least one neural network based on a comparison between said first output data and said second output data,
  after said updating, processing said received radio signal data with said second signal processing chain, without applying said at least one first processing module.

In some embodiments, the at least one first processing module comprises a first channel estimation module and said at least one second processing module comprises a second channel estimation module.

Said means may be further configured for updating parameters of said at least one neural network based on a demodulation error of the output of the second channel estimation module, during said processing of said received radio signal data with said second signal processing chain without applying said at least one first processing module.

In some embodiments, the at least one first processing module comprises a first demodulation module and the at least one second processing module comprises a second demodulation module.

In some embodiments, said means are further configured for updating parameters of said at least one neural network based on a decoding error of the output of the second demodulation module, during said processing of said received radio signal data with said second signal processing chain without applying said at least one first processing module.

In some embodiments, processing said received radio signal data with the first signal processing chain comprises determining a first codeword and processing said received radio signal data with the second signal processing chain comprises determining a second codeword, wherein said means are further configured for repeating said processing and said updating until a test determines that the first and second codewords are equals or that the bit error rates of decoding the first and second codewords are equals.

In some embodiments, said means include at least one processor and at least one memory, the at least one memory storing computer program code, the at least one memory and the computer program code being configured to, with the at least one processor, cause the apparatus to at least in part perform the functions discussed above.

Embodiments also relate to a Method for processing signal data, executed by an apparatus, comprising:
  processing received radio signal data with a first signal processing chain, wherein said first processing chain comprises at least one first processing module configured for determining first output data based on said received radio signal data,
  processing said received radio signal data with a second signal processing chain, wherein said second processing chain comprises at least one second processing module configured for determining an estimation of said first output data based on said received radio signal data, and at least one neural network configured for determining second output data based on said estimation,
  updating parameters of said at least one neural network based on a comparison between said first output data and said second output data,
  after said updating, processing said received radio signal data with said second signal processing chain, without applying said at least one first processing module.

Embodiments also relate to a computer program comprising instructions for performing the method mentioned before when said instructions are executed by a computer. The computer program may be stored on a computer readable medium. The computer readable medium may be a non-transitory computer readable medium.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

Figure 1:
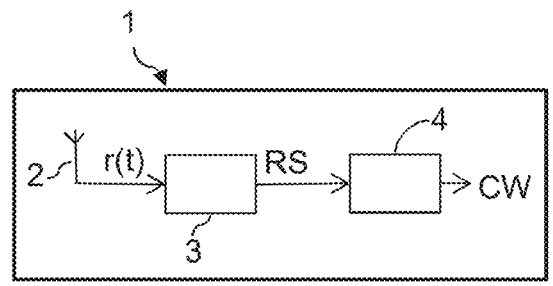
FIG. 1 is a block diagram of a wireless communication device.

FIG. 1 is a block diagram of a wireless communication device 1. The wireless communication device 1 comprises at least one antenna 2, a radio-frequency module 3 and a baseband processor 4. The wireless communication device 1 may be a wireless receiver/transmitter or a wireless receiver.

The radio-frequency module 3 converts, by frequency shifting, filtering and analog to digital conversion, a radio signal r(t) captured by the antenna 2 into received radio signal data RS. The received radio signal data RS comprises for example successive received samples, which are digital vectors representing a determined part of the radio signal, for example an appropriate part of an OFDM signal.

The baseband processor 4 converts received radio signal data RS into successive detected codewords CW. Detailed functioning of the baseband processor 4 will be described hereafter with reference to FIGS. 2 and 3.

The wireless communication device 1 may comprises other elements not shown of FIG. 1, e.g. for wireless transmitter, user interface, data storage and processing . . . . The wireless communication device 1 may be a user device, e.g. a smart phone, or a network element, e.g. a wireless access point or a cellular network base station . . . . The radio-frequency module 3 and the baseband processor 4 may be located in a common housing, or located in different housing and connected by an appropriate link. The wireless communication device 1 may use a wireless communication standard for communication, e.g. IEEE Wi-Fi, 3GPP 3G, 4G, 5G . . . .

Figure 2:
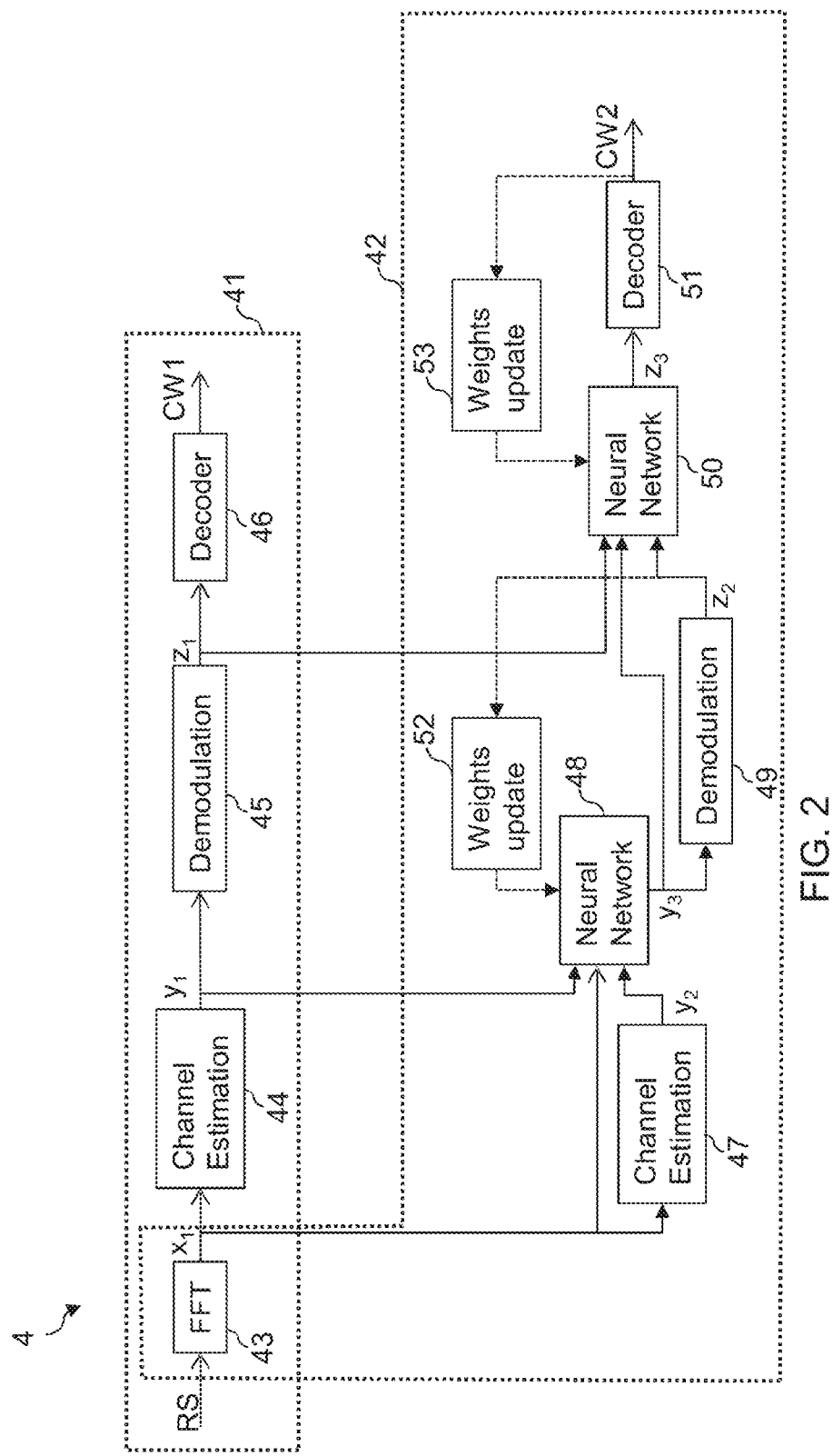
FIG. 2 is a functional view of the baseband processing of the wireless communication device of FIG. 1.

FIG. 2 is a functional block diagram of the baseband processor 4. The baseband processor 4 comprises two processing chains: a signal processing chain 41 and a signal processing chain 42.

The signal processing chain 41 converts received radio signal data RS into detected codewords CW1. The signal processing chain 41 comprises a Fast Fourier Transform module 43, a Channel Estimation module 44, a Demodulation module 45 and a decoder module 46.

The Fast Fourier Transform module 43 converts the received radio signal data RS into the frequency domain and outputs successive vectors $x_1$. The channel estimation module 44 performs channel estimation based on the vectors $x_1$, and output successive vectors $y_1$ which are the corrected version of the vectors $x_1$ using its estimated channel state information (CSI), e.g. gain, phase, timing information. The Demodulation module 45 performs soft demodulation, e.g. determination of a soft value call Log Likelihood Ratio (LLR) for each received bit. The Demodulation module output successive vectors $z_1$ of LLR values. The decoder module 46 determines successive codewords CW1 based on the vectors $z_1$, by applying a decoding technique such as LDPC/Turbo/Polar . . . decoding.

The signal processing chain 42 converts received radio signal data RS into detected codewords CW2. The signal processing chain 42 comprises the Fast Fourier Transform module 43 (which is common to both processing chains), a Channel Estimation module 47, a first neural network 48, a Demodulation module 59, a second neural network 50 and a decoder module 51.

The channel estimation module 47 performs channel estimation based on the vectors $x_1$, and output successive vectors $y_2$ which are the corrected version of the vector $x_1$ based on its estimated channel state information (CSI), e.g. gain, phase, timing information. When comparing the channel estimation modules 44 and 47, the channel estimation module 44 uses a more accurate estimation algorithm than the channel estimation module 47. In other words, a vector $y_2$ may be seen as an estimation or approximation of a corresponding vector Consequently, the channel estimation module 44 consumes more processing resources than the channel estimation module 47. The neural network 48, once trained, determines a vector $y_3$ based on a vector $x_1$ and corresponding vector $y_2$. More specifically, the trained neural network 48 aims at correcting the vector $y_2$ to match the corresponding vector $y_1$. The neural network 48 is for example a feedforward deep neural network. Training of the neural network 48 is described in more details hereafter. Accordingly, together, the channel estimation module 47 and the trained neural network 48 are capable to output a vector $y_3$ based on a vector $x_1$, which match a corresponding vector $y_1$, but consume less processing resources and may efficiently be implemented on a more general-purpose processor than the channel estimation module 44.

The Demodulation module 49 performs soft demodulation, e.g. determination of a soft value call Log Likelihood Ratio (LLR) for each received bit. The Demodulation module 49 output successive vectors $z_2$ of LLR values based on corresponding vectors $y_3$. When comparing the Demodulation modules 45 and 49, the Demodulation module 45 uses a more accurate estimation algorithm than the Demodulation module 49. In other words, a vector $z_2$ may be seen as an estimation or approximation of a corresponding vector $z_1$. Consequently, the Demodulation module 45 consumes more processing resources than the Demodulation module 49. The neural network 50, once trained, determines a vector $z_3$ based on a vector $y_3$ and corresponding vector $z_2$. More specifically, the neural network 50 aims at correcting a vector $z_2$ to match the corresponding vector $z_1$. The neural network 50 is for example a feedforward deep neural network. Training of the neural network 50 is described in more details hereafter. Accordingly, together, the Demodulation module 49 and the trained neural network 50 are capable to output a vector $z_3$ based on a vector $y_3$, which match a corresponding vector $z_1$, but consume less processing resources than the Demodulation module 45.

The decoder module 51 determines successive codewords CW2 based on the vectors $z_3$, by performing LDPC/Turbo/Polar/any other channel decoding techniques. In some embodiment, the decoder module 51 may apply a neural network.

When comparing the processing chains 41 and 42, the processing chain 41 may be seen as a «classical» receiver, which rely on high accuracy algorithms for channel estimation and demodulation, but requires a higher level of processing resources. In contrast, the processing chain 42 may be seen as a «neural network-based» receiver, which rely on lower accuracy algorithms for channel estimation and demodulation, and thus requires a lower level of processing resources, and involves trained neural networks to compensate the use of lower accuracy algorithm. In some embodiments, this concept of using a lower accuracy algorithm combined with a trained neural network is applied to the channel estimation only, or to the demodulation only or channel decoding only.

Figure 3:
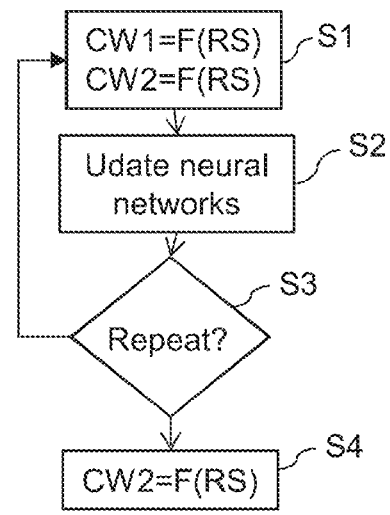
FIG. 3 is a flowchart of a method for signal processing.

FIG. 3 is a flowchart of a method for signal processing, illustrating the functioning of the baseband processor 4. The functioning involves a training phase (steps S1 to S3) and an inference phase (Step S4). The method of FIG. 3 is executed by the wireless communication device 1, in particular by the baseband processor 4.

In the training phase, both processing chains 41 and 42 process received radio signal data RS in parallel (Step S1). Accordingly, the processing chain 41 determines codewords CW1 based on received radio signal data RS, and this involves determining the intermediate vectors $x_1$, $y_1$ and $z_1$. In parallel, the processing chain 42 determines codewords CW2 based on received radio signal data RS, and this involves determining the intermediate vectors $x_1$, $y_2$, $y_3$, $z_2$ and $z_3$. This is repeated iteratively for successive received samples of the received radio signal data RS and codewords CW1, CW2.

At each iteration of the training phase, the baseband processor 4 updates the parameters of the neural network 48 based on a comparison between the vectors $y_3$ and $y_1$, and the parameters of the neural network 50 based on a comparison between the vectors $z_3$ and $z_1$ (step S2). For example, for given values of the vectors $x_1$, $y_1$ and $y_2$, weights of the neural network 47 are updated by applying the SGD algorithm, taking the mean square error between vectors $y_3$ and $y_1$ as loss function. Similarly, for given values of the vectors $y_3$, $z_1$ and $z_2$, weights of the neural network 50 are updated by applying the SGD algorithm, taking the mean square error between vectors $z_3$ and $z_1$ as loss function. In embodiments wherein the decoder module 51 uses a neural network, training is also performed for this neural network.

Steps S1 and S2 are repeated until a completion test is satisfied (step S3). The completion test may be for example: Both processing chains 41 and 42 give the same output, i.e. CW1=CW2, or the bit error rate of decoding CW1 and CW2 are equals.

In the inference phase, only the processing chain 42 processes received radio signal data RS (Step S4). Accordingly, the processing chain 42 determines codewords CW2 based on received samples, and this involves determining the intermediate vectors $x_1$, $y_2$, $y_3$, $z_2$ and $z_3$. In the inference phase, the processing chain 41 is not active. Accordingly, the Channel Estimation module 44, the Demodulation module 45 and the decoder module 46 do not process signal data, and no codeword CW1 or intermediate vectors $y_1$ and $z_1$ is determined.

In the wireless communication device 1, in the inference phase, codewords CW2 may be determined based on received samples of the received radio signal data RS with the use of simple algorithms for channel estimation and/or demodulation combined with trained neural networks. This requires less processing resources (e.g. less energy, time, memory, processor cycles ...) than the use of more complex algorithms for channel estimation and/or demodulation. Moreover, in the training phase, the processing chain 41 allows to obtain data for training the neural networks without the need to rely on separate input of training data or to obtain trained neural network from an external source.

We now describe examples of channel estimation techniques that may be used by the channel estimation modules 44 and 47, for example in the case of an OFDM receiver.

The channel estimation problem involves estimating the channel distortion based on known pilot symbols introduced at known carriers in the transmitted OFDM symbol. Two well-known techniques are zero forcing and Minimum Mean Square Error (MMSE).

Assuming P pilots are inserted at $k^{th}$ location in the transmitted sequence, p(k) is the transmitted pilot sequence and h(n) is the channel, the received pilot symbol $x_1(k)$ can be expressed as the received pilot sequence $x_1(k) = \sum_{n=0}^{P-1} p(k-n)h(n), k=0 \ldots P-1$=location of pilots in the received sequence The job of the channel estimation is to find the correct h(n) based on the received pilots.

The Zero forcing solution is given by: $h=p_1^{-1}x_1$: This solution is simple as it involves inverse of a pilot symbols, but it is noise prone because at low SNR region it tends to amplify received noise.

The MMSE solution is given by: $h=R_{pp}^{-1}R_{px_1}$, where $R_{px_1}=p^T x_1$, $R_{pp}=p^T p$: This solution is better but more complex than the simple zero-forcing equalization as this involves matrix multiplication and inverse operations.

Accordingly, in some embodiments, the channel estimation module 44 applies the MMSE solution and the channel estimation module 47 applies the Zero forcing solution. Channel state matrix h(n) thus computed is used to determine $y_2$, as $y_2 = h(n) * x_1$, where * is the multiplication operation.

For training the neural network 48, as use case, let's assume zero forcing equalizer for channel equalization module 47 with input $x_1$ and output $y_2$ (as shown in FIG. 1). The channel estimation module 44 (MMSE or better algorithm) provides the desired output $y_1$. During initial training phase, the neural network 48 is trained to output $y_3$ such that the mean square error (MSE) between vectors $y_1$ and $y_3$ is zero:

$MSE(y_1, y_3) = 0$, given $x_1, y_1, y_2$

We now describe example of demodulation techniques applied by the demodulation modules 45 and 49.

To enable optimum performance at the decoding stage, soft demodulation is normally proposed. Soft demodulation involves computation of soft value, called Log-Likelihood Ratio (LLR) for each received bit. The LLR ($L_m$) for the m-th bit $b_m$ of a received symbol $\hat{s} = y_1$ can be given as $$L_m^i = \log \frac{P(b_m = 1 | \hat{s})}{P(b_m = 0 | \hat{s})} \quad (1)$$

Assuming a distortion by Gaussian noise, and the noise on real and imaginary part is independent and identically distributed Gaussian variable then the above formula becomes:

$$L_m^i = -\log \frac{\sum_{s \in s_m^{(1)}} \exp(-SNR_i \cdot |\hat{s} - s|^2)}{\sum_{s \in s_m^{(0)}} \exp(-SNR_i \cdot |\hat{s} - s|^2)} \quad (2)$$

Where $SNR_i$ is the Signal-to-Noise Ratio on symbol i.

The above formula is computationally complex and expensive to implement in hardware as it involves logarithmic, division, exponent, and square operations. Hence, the max-log-MAP approximated version is proposed:

$$L_m = -\left(-SNR \cdot \min_{s \in s_m^{(1)}} (|\hat{s} - s|^2) + SNR \cdot \min_{s \in s_m^{(0)}} (|\hat{s} - s|^2)\right) = \quad (3)$$

-continued $$\left(\min_{s \in s_m^{(1)}} (|\hat{s} - s|^2) - \min_{s \in s_m^{(0)}} (|\hat{s} - s|^2)\right) \cdot SNR$$

The above formula needs to calculate the distance between $\hat{s}_i$ and all constellation points, and the computation becomes complex for larger constellations, i.e. 64QAM and 256QAM. A less computationally-intensive algorithm is proposed. For 16-QAM, the proposed formula is $$L_m = \begin{cases} SNR \cdot 2d \cdot (2\text{Re}(\hat{s}) - d) \\ SNR \cdot 2d \cdot \text{Re}(\hat{s}) \\ SNR \cdot 2d \cdot (2\text{Re}(\hat{s}) + d) \end{cases}, \text{if} \begin{cases} d \leq \text{Re}(\hat{s}) \\ -d < \text{Re}(\hat{s}) < d \\ \text{Re}(\hat{s}) \leq -d \end{cases}$$

Where, $d=2/\sqrt{10}$.

A much-simplified formula is proposed in the working 5G standards. The simplified formula for 16QAM is given below:

$L_0 = SNR \cdot 2d \cdot \text{Re}(\hat{s})$ $L_1 = SNR \cdot 2d \cdot \text{Im}(\hat{s})$ $L_2 = SNR \cdot 2d \cdot (d - |\text{Re}(\hat{s})|)$ $L_3 = SNR \cdot 2d \cdot (d - |\text{Im}(\hat{s})|)$ (4)

Using the different simplified formulae above for computing the LLR reduces the hardware complexity but comes at the cost of performance degradation. The proposed solution in the wireless communication device 1 compensates the loss of performance degradation by introducing a neural network 50 after the demodulation module 49.

The inputs to the demodulator is the received frequency samples $\hat{s}$ (=$y_1$ or $y_3$) after the channel estimation phase and the SNR of the channel (which is an external input). In some embodiments, the demodulation module 45 uses the demodulation algorithm (1) listed above and the demodulation module 49 uses one of the approximate demodulation algorithms (2)-(4).

During the training phase, the neural network 50 is trained until there is zero difference in the bit error rate between the Decoded CW1 and CW2.

In some embodiment, the wireless communication device 1 also comprises a weights update module 52 and/or a weights update module 53. More specifically, the signal processing chain 42 comprises the weights update module 52 and/or the weights update module 53.

During the inference phase, the neural network 48 is on-the-fly fine-tuned iteratively by the weights update module 52 to output $y_3$ such that:

demodulation error of $y_3$=0, Given $x_1, y_2, y_4$

Similarly, during the inference phase, the neural network 50 is on-the-fly fine-tuned iteratively by the weights update module 53 to output $z_3$ such based on the bit error rate of CW2.

Figure 4:
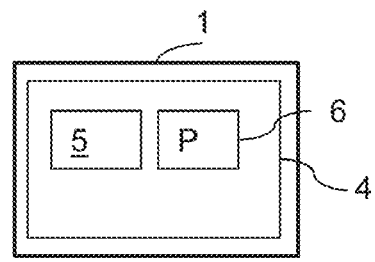
FIG. 4 is a structural view of the wireless communication device.

FIG. 4 is a structural view of the wireless communication device 1, according to some embodiments. More specifically, in some embodiment, the baseband processor 4 comprises at least one processor 5 and at least one memory 6. The at least one memory 6 stores computer program code P. The at least one memory 6 and the computer program code P are configured to, with the at least one processor 5, cause the wireless communication device 1 to at least in part perform the method of FIG. 3.

It should be noted that although examples of methods have been described with a specific order of steps, this does not exclude other implementations. In particular, the described steps may be executed in another order, partially or totally in parallel . . . .

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represent various processes which may be substantially represented in computer readable medium and so executed by a computer or processor, whether or not such computer or processor is explicitly shown.

While the principles of the invention have been described above in connection with specific embodiments, it is to be clearly understood that this description is made only by way of example and not as a limitation on the scope of the invention, as defined in the appended claims.

The invention claimed is:

1. Apparatus for processing a received radio signal, the apparatus comprising:
at least one processor and at least one memory, the at least one memory storing computer program code, the at least one memory and the computer program code being configured to, with the at least one processor, cause the apparatus to at least in part perform,
processing received radio signal data with a first signal processing chain, wherein said first processing chain comprises at least one first processing module configured to determine first output data based on said received radio signal data,
processing said received radio signal data with a second signal processing chain, wherein said second processing chain comprises at least one second processing module configured to determine an estimation of said first output data based on said received radio signal data, and at least one neural network configured to determine second output data based on said estimation,
updating parameters of said at least one neural network based on a comparison between said first output data and said second output data, after said updating, processing said received radio signal data with said second signal processing chain, without applying said at least one first processing module.

2. Apparatus according to claim 1, wherein said at least one first processing module comprises a first channel estimation module and said at least one second processing module comprises a second channel estimation module.

3. Apparatus according to claim 2, wherein the at least one memory and the computer program code is configured to, with the least one processor, further cause the apparatus to at least in part perform, updating parameters of said at least one neural network based on a demodulation error of the output of the second channel estimation module, during said processing of said received radio signal data with said second signal processing chain without applying said at least one first processing module.

4. Apparatus according to claim 1, wherein said at least one first processing module comprises a first demodulation module and said at least one second processing module comprises a second demodulation module.

5. Apparatus according to claim 4, wherein said the at least one memory and the computer program code is configured to, with the at least one processor, further cause the apparatus to at least in part perform, updating parameters of said at least one neural network based on a decoding error of the output of the second demodulation module, during said processing of said received radio signal data with said second signal processing chain without applying said at least one first processing module.

6. Apparatus according to claim 1, wherein
the processing said received radio signal data with the first signal processing chain comprises determining a first codeword,
the processing said received radio signal data with the second signal processing chain comprises determining a second codeword,
the at least one memory and the computer program code is configured to, with the at least one processor, further cause the apparatus to at least in part perform, repeating the processing said received radio signal data with the first signal processing chain, the processing said received radio signal data with the second signal processing chain and said updating until a test determines that the first and second codewords are equals or that the bit error rates of decoding the first and second codewords are equals.

7. Method for processing signal data, executed by an apparatus, comprising:
processing received radio signal data with a first signal processing chain, wherein said first processing chain comprises at least one first processing module configured to determine first output data based on said received radio signal data,
processing said received radio signal data with a second signal processing chain, wherein said second processing chain comprises at least one second processing module configured to determine an estimation of said first output data based on said received radio signal data, and at least one neural network configured to determine second output data based on said estimation,
updating parameters of said at least one neural network based on first output data and said second output data,
after said updating, processing said received radio signal data with said second signal processing chain, without applying said at least one first processing module.

8. A non-transitory computer readable medium storing program code that when executed by a processor causes an apparatus including the processor to perform the method of claim 7.

* * * * *

UNITED STATES PATENT AND TRADEMARK OFFICE
CERTIFICATE OF CORRECTION

PATENT NO. : 11,405,243 B2
APPLICATION NO. : 17/276264
DATED : August 2, 2022
INVENTOR(S) : Manil Dev Gomony et al.

Page 1 of 1

It is certified that error appears in the above-identified patent and that said Letters Patent is hereby corrected as shown below:

In the Claims

Column 9 Line 9 Claim 3 should read:
3. Apparatus according to claim 2, wherein the at least one memory and the computer program code is configured to, with the at least one processor, further cause the apparatus to at least in part perform, updating parameters of said at least one neural network based on a demodulation error of the output of the second channel estimation module, during said processing of said received radio signal data with said second signal processing chain without applying said at least one first processing module.

Signed and Sealed this
Fourth Day of October, 2022

Katherine Kelly Vidal
*Director of the United States Patent and Trademark Office*